US012353960B2

(12) United States Patent
Wolkowicz et al.

(10) Patent No.: US 12,353,960 B2
(45) Date of Patent: Jul. 8, 2025

(54) ENGAGEMENT PREDICTION OF IMAGE ASSETS ON SOCIAL MEDIA

(71) Applicant: Dash Hudson, Halifax (CA)

(72) Inventors: Jacek Wolkowicz, Halifax (CA); Tomasz Niewiarowski, Halifax (CA)

(73) Assignee: Dash Hudson, Halifax (CA)

( * ) Notice: Subject to any disclaimer, the term of this patent is extended or adjusted under 35 U.S.C. 154(b) by 668 days.

(21) Appl. No.: 16/696,569

(22) Filed: Nov. 26, 2019

(65) Prior Publication Data

US 2021/0158208 A1 May 27, 2021

(51) Int. Cl.
*G06N 20/00* (2019.01)
*G06F 16/9535* (2019.01)
*G06N 3/045* (2023.01)
*G06N 3/08* (2023.01)
*G06Q 50/00* (2024.01)

(52) U.S. Cl.
CPC ......... *G06N 20/00* (2019.01); *G06F 16/9535* (2019.01); *G06N 3/045* (2023.01); *G06N 3/08* (2013.01); *G06Q 50/01* (2013.01)

(58) Field of Classification Search
CPC ........ G06N 20/00; G06N 3/0454; G06N 3/08; G06N 7/005; G06F 16/9535; G06Q 50/01
See application file for complete search history.

(56) References Cited

U.S. PATENT DOCUMENTS

| | | | |
|---|---|---|---|
| 9,122,989 B1* | 9/2015 | Morris | G06Q 30/02 |
| 2015/0081609 A1* | 3/2015 | Hande | G06Q 50/01 |
| | | | 706/46 |
| 2015/0161517 A1* | 6/2015 | Bae | G06Q 50/01 |
| | | | 709/204 |
| 2016/0379243 A1* | 12/2016 | Kalish | G06Q 30/0242 |
| | | | 705/14.41 |
| 2017/0048184 A1* | 2/2017 | Lewis | G06Q 30/0631 |
| 2018/0174190 A1* | 6/2018 | Ferreira | G06Q 50/01 |
| 2019/0166184 A1* | 5/2019 | Lagares-Greenblatt | |
| | | | G06F 40/30 |
| 2019/0339824 A1* | 11/2019 | Hamedi | G06V 10/761 |
| 2020/0007932 A1* | 1/2020 | Zavesky | H04N 21/44016 |
| 2020/0210764 A1* | 7/2020 | Hamedi | G06K 9/6262 |

OTHER PUBLICATIONS

Khosla, A., Das Sarma, A., & Hamid, R. (2014, April). What makes an image popular?. In Proceedings of the 23rd international conference on World wide web (pp. 867-876). https://doi.org/10.1145/2566486.2567996 (Year: 2014).*

* cited by examiner

*Primary Examiner* — John T Repsher, III
(74) *Attorney, Agent, or Firm* — Polsinelli PC

(57) ABSTRACT

The present technology can receive a collection of candidate images that are candidates for posting on a social media platform, and then determine, using artificial intelligence model, a prediction of expected engagement on the social media platform for each image of the candidate images.

28 Claims, 8 Drawing Sheets

ENGAGEMENT PREDICTION OF IMAGE ASSETS ON SOCIAL MEDIA

TECHNICAL FIELD

The present technology pertains to engagement prediction of an image, and more specifically to predict social media engagement of an image based on its content.

BACKGROUND

Brands covet engagement between the public and their brand through posts on social media on accounts managed by the brand. In fact, the term, "viral" has been coined to explain when a post not only achieves high engagement, but when social media users interact and share a post so often that the post enters the mainstream public consciousness to the point that news outlets might even report on the engagement with the post.

While having a post "go viral" occurs infrequently, brands value more typical levels of engagement. Some brands employ social media professionals that are responsible for posting enough content to keep their brand in the consciousness of those that follow the brand, and for posting brand specific content. It is not enough for these professionals to just post a quantity of content; they must also post content that customers engage with. Engagement ensures relevance of the brand, and is generally seen as a measure of value of a post, which costs money to curate. At the same time, posts that do not generate sufficient engagement can, at a minimum be seen as a poor investment of resources, and at a worst case, be seen as harmful to the brand's image.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
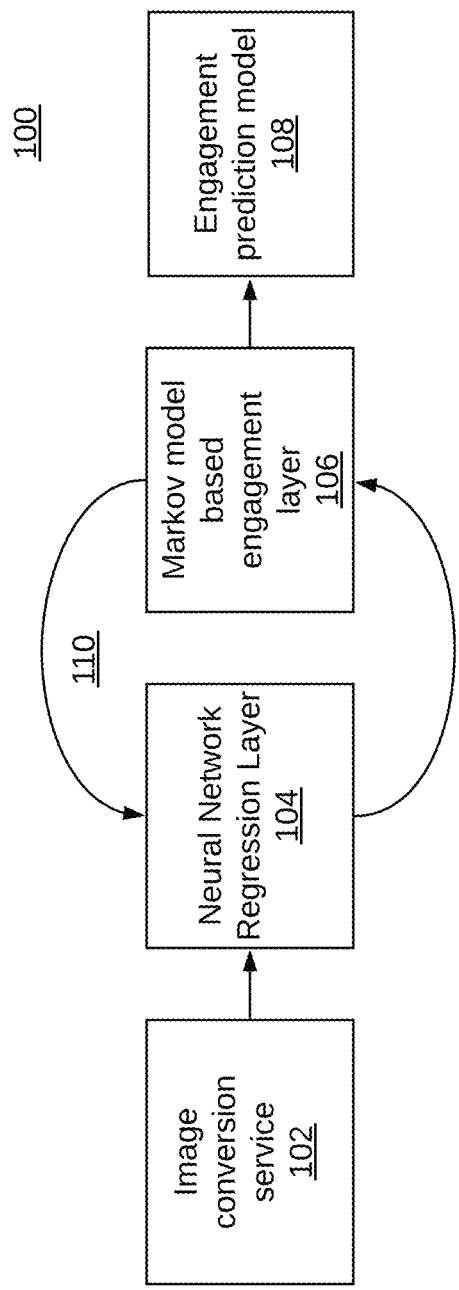
FIG. 1 illustrates an example system for training and operating a deep learning neural network for engagement prediction, in accordance with some aspects of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present technology addresses a need in the art for predicting social media engagement of an image based on its content. There have been at least two major obstacles in this area. First, there is no satisfactory technology to analyze an image based on its content. Second, even if a technology could recognize subtle similarities between candidate images and images that have performed well (good engagement) on social media in the past, it is difficult to predict future engagement.

Brands value engagement with their content posted on social media. Some brands employ social media professionals that are responsible for posting enough content to keep their brand in the consciousness of those that follow the brand, and for posting brand specific content. It is not enough for these professionals to just post a quantity of content; they must also post content that customers engage with. Engagement ensures relevance of the brand, and is generally seen as a measure of value of a post, which costs money to curate. At the same time, posts that do not generate sufficient engagement can, at a minimum be seen as a poor investment of resources, and at a worst case, be seen as harmful to the brand's image.

The present technology addresses the above needs in the art by analyzing the images to create complex representations of the images using machine learning models. Such models are combined with a distribution of engagement over time of images posted in the past which is relevant to determining future engagement.

Specifically, the disclosed technology can receive a collection of candidate images that are candidates for posting on a social media platform, and determine, using at least one artificial intelligence model, a prediction for each image of the candidate images of expected engagement on the social media platform.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

As used herein the term "brand" shall be used to refer to any organization, company, or individual who is using an account to share contents on social media platforms. As used herein the term "engagement rates" shall be used to refer to a ratio of interactions on social media platforms for a specific image divided by the number of impressions or views of that image, or a score based on the overall numbers of interactions on social media platforms for a specific image. Interactions on social media platforms shall be used to refer to, but are not limited to, actions performed on a specific image through the social media platform, such as likes, comments, or reactions. The number of impressions includes, but is not limited to, the number of views of a specific image, the number of user accounts to which an image was displayed, etc.

As used herein the term "duplicate" shall be used to refer to a visually nearly identical image, or an image that has been manipulated such as resizing, cropping, changing resolution, color space morphing, applying filters, or manipulated via post processing techniques. The manipulated image and the original image retain the same image content, but a different appearance. These duplicates can have the same image content but different file data. The proper understanding of these terms will be apparent to persons of ordinary skill in the art in the context in which the term is used.

FIG. 1 illustrates an example system 100 for training and operating a deep learning neural network for engagement prediction, in accordance with some aspects of the present technology. The system 100 includes an image conversion service 102, and the image conversion service 102 can include a deep neural network. The image conversion service 102 receives images and can output a representation of the images. For example, convolutional neural networks can be trained to analyze image content and output representations. In such systems the output of the convolutional neural network can be a high-dimensional representation of the content of the image, herein referred to as a feature vector of the image An example of a deep neural network included in the image conversion service 102 is the GOOGLE INCEPTION deep neural network. In some embodiments, the feature vector received from image conversion service 102 is a high dimensional representation of the content of an image. Such high dimensional representation can include over 2048 bits and is a specific representation of the image based on its content. In some embodiments, the feature vector might not be the final output of the image conversion service 102 and instead the feature vector might be an intermediate representation of the image that image conversion service 102 might use for some other purposes.

The system 100 includes a neural network regression layer 104 and a Markov model based engagement layer 106. The neural network regression layer 104 can receive the high-dimensional representation of one or more images from image conversion service 102. The neural network regression layer 104 is used to determine a relationship between the high-dimensional representation of the content of the images and their corresponding past engagement rates.

The Markov model based engagement layer 106 represents past engagement rates of the images modeled in view of time periods. The use of a Markov model reflects the inventors' understanding that what performs well in one time period is dependent, in part, on conditions in a prior time period. In probability theory, a Markov model is a stochastic model used to model randomly changing systems. It is assumed that future states depend on the current state. Because the engagement prediction model applies a Markov model based layer, some embodiments can better predict the engagement rate of an input image in a certain time window in the immediate future, based on the past engagement rates images in a certain time window of the present and in the past.

The Markov model based engagement layer 106 is used in conjunction with the neural network regression layer 104, wherein the neural network regression layer 104 learns a relationship between the high-dimensional representation of the content of the images and their corresponding past engagement rates as modeled in the Markov model base engagement layer 106. In other words the neural network regression layer 104 tries to learn and to predict the engagement of a given image based on past time periods represented in the Markov model based engagement layer 106. And the neural network regression layer 104 receives feedback on its correct and incorrect predictions about the actual performance of the image, which is known. The neural network regression layer 104 continues to update and refine its learning until its performance in predicting engagement rates is sufficiently accurate when measured against known past performance of a sample of images.

Once the neural network regression layer 104 is sufficiently accurate when measured against known past performance of a sample of images, the machine learning model can be considered trained as the engagement prediction model 108. The engagement prediction model 108 can then be used to predict the future engagement rates of an input image.

Figure 2:
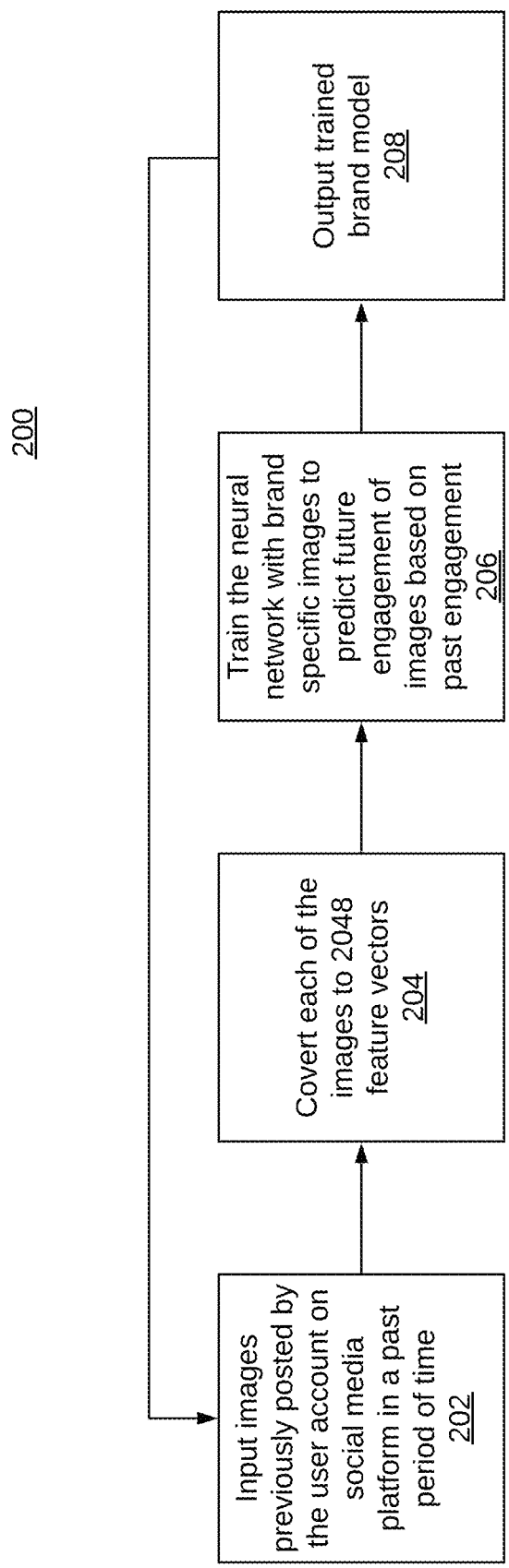
FIG. 2 illustrates an example method for training a brand model using a deep learning neural network for engagement prediction, in accordance with some aspects of the present technology.
Figure 3:
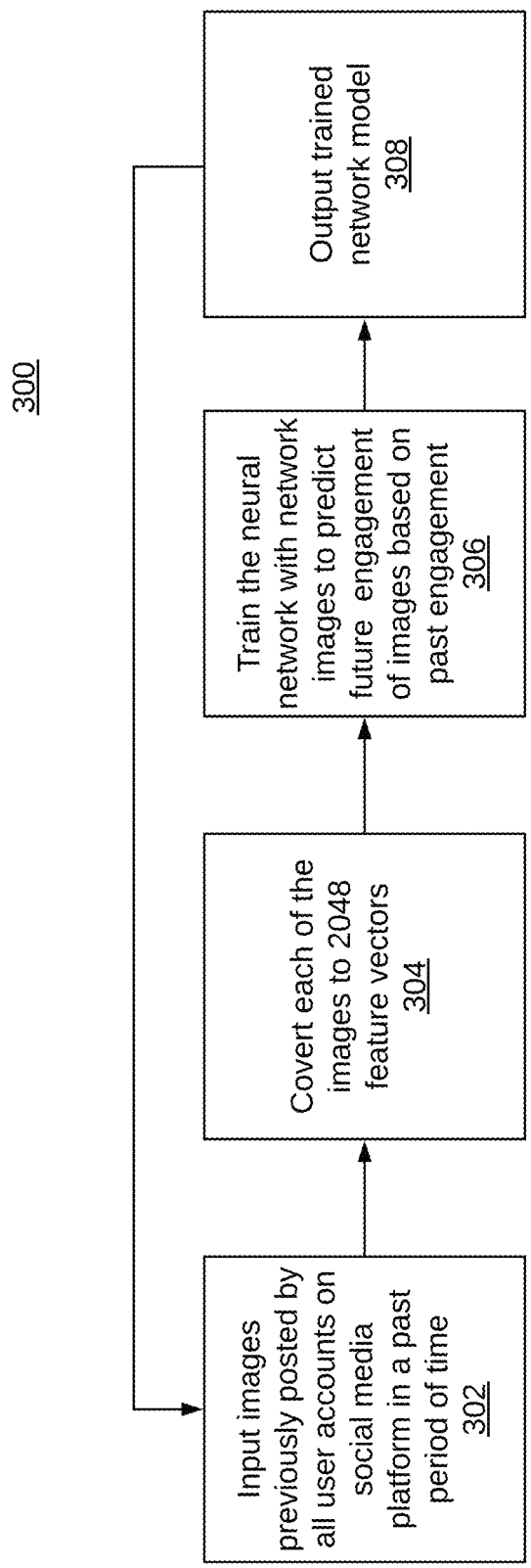
FIG. 3 illustrates an example method for training a network model using a deep learning neural network for engagement prediction, in accordance with some aspects of the present technology.

In some embodiments, the system illustrated in FIG. 1 can be used to train multiple models. For example, some aspects of the present technology utilize a brand model, and some aspects of the present technology utilize a network model. In some embodiments, the present technology can also utilize an industry model. The difference in the brand, industry, and network models differ principally in the data used to train the respective model. FIG. 2 illustrates a method for training a brand model and FIG. 3 illustrates a method of training a network model.

FIG. 2 illustrates an example method 200 for training a brand model for engagement prediction, in accordance with some aspects of the present technology. This brand model is a version of the engagement prediction model 108 (from FIG. 1) that is trained with data from a brand specific social media account, and therefore the model is only relevant to making predictions for future engagement of an input image for posting through the brand specific social media account.

The system 100 first receives images previously posted by the brand specific social media account on the social media platform in a past time window (202). The image conversion service 102 then converts each of the received images into feature vectors based on its content (204). This conversion process has been detailed above with regard to FIG. 1.

The system 100 trains the deep neural network with the images previously posted by the brand-specific social media account to learn to predict engagement of images using the past engagement data as feedback to determine the accuracy of the brand model as described with respect to FIG. 1 for the training of the neural network regression layer 104 using the Markov model based engagement layer 106 to output (208) the brand model.

In some embodiments, the brand model can be retrained periodically, e.g., every week or every month, by repeating the processes illustrated in FIG. 2. The retraining of the brand model can be useful to not only refine the model to be more accurate, but also to train the model with data from the most recent period, which can affect predictions for the next period. In some embodiments, the engagement prediction model 108 can be used to predict the engagement rate of an input image in the next week. In some embodiments, the length of this time window can be adjusted based on the user's requirements.

FIG. 3 illustrates an example method 300 for training a network model of a deep learning neural network for engagement prediction, in accordance with some aspects of the present technology. This network model is a version of the engagement prediction model 108 that is generic based on images collected from among all posts on a social media platform. Example method 300 includes processes 302, 304, and 308 that are substantially similar to the processes 202, 204, and 208, thus redundant description will be omitted. One of the main difference between example method 300 and example method 200 is that input images in process 302 are images posted by all user account, and process 306 is performed by training the neural network with images posted by all user accounts as opposed to the brand-specific account as addressed with respect to FIG. 2. In some embodiments, the network model is trained to predict future engagement of an input image for posting by any account on the social media network, based on past engagement of all images posted on the social media platform.

The other main difference between example method 300 and example method 200 is that method 300 may be retrained less frequently than the brand model addressed with respect to FIG. 2. The network model may be retrained less frequently because it can take substantially longer to train given that it is trained across a larger set of data, and because, as will be addressed below, it is not used to predict high engagement of images, but rather used to identify images that are likely to perform poorly.

In some embodiments, a version of the engagement prediction model 108 that is industry specific can be provided as well. Such an industry model is a version of the engagement prediction model 108 that is industry specific, and it is trained to predict future engagement of an input image for posting through a social media account in a specific industry, based on past engagement of images related to that industry.

Figure 4:
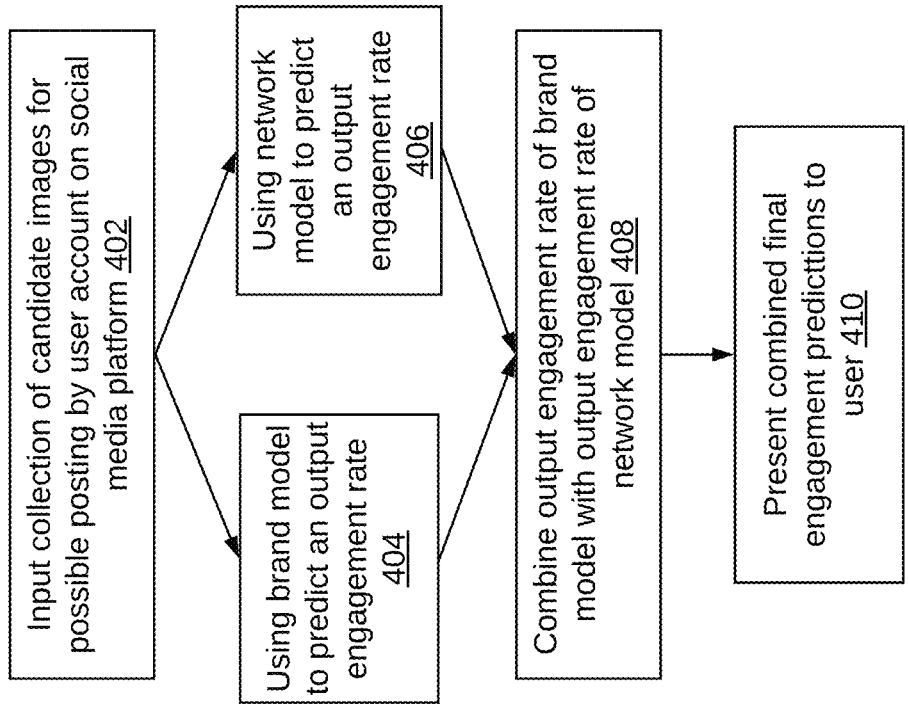
FIG. 4 illustrates an example method for predicting an engagement rate of images based on a combined result of both the brand model and the network model, in accordance with some aspects of the present technology.

FIG. 4 illustrates an example method 400 for predicting an engagement rate of images based on a combined result of both the brand model and the network model, in accordance with some aspects of the present technology. System 100 first receives a collection of candidate images for possible posting by a brand-specific user account on social media platform (402). The brand-specific user account should be the same user account used to train the machine learning model to yield the brand model as addressed with respect to FIG. 2. In some embodiments, the input collection can be one image.

System 100 uses the brand model 208 to predict a brand-specific output engagement rate for each candidate images (404), and uses the network model 308 to predict a general output engagement rate for each of the candidate images (406). In some embodiments, both processes 404 and 406 can be performed at the same time. In some embodiments, one of the processes 404 and 406 can be performed before the other.

In some embodiments, the brand model 208 can output candidate images in groups based on their corresponding predicted engagement rate if they were posted by the brand-specific user account. In such an output, each image of the candidate images is grouped into one of several categories such as: expected high performance (predicted to perform in the top 25% of images), expected poor performance (predicted to perform in the bottom 50% of images), or expected average performance (predicted to perform in the middle 25% of images).

The general model 308 can also output candidate images in groups, where each image of the candidate images are grouped into one of the above categories. In some embodiments, the group of images with expected high performance have high engagement rates. Such a high engagement rate is determined as when an image is predicted to have an engagement rate in the top 25% of all posted images. In some embodiments, the group of images with expected poor performance have low engagement rates. Such a poor engagement rate is determined as when an image is predicted to have an engagement rate in the bottom 50% of all posted images. In some embodiments, the group of images with expected average performance have average engagement rates. Such an average engagement rate is determined as when an image is predicted to have an engagement rate in the middle 25% of all posted images.

In some embodiments, such classification of expected high performance, expected poor performance, or expected average performance, and the corresponding percentile of all images can vary based on the overall quality of current photos.

Finally, the system 100 combines the brand-specific output engagement rate of the brand model 208 with the general output engagement rate of the network model 308 to generate a final engagement rate prediction (408) for each of the candidate images, and then present such a combined final engagement rate prediction to the user (410). In some embodiments, the system 100 combines brand-specific output engagement rate of the brand model 208 with the general output engagement rate of the network model 308. In some embodiments, the output of the two models can be averaged to yield a final engagement rate for each image. In some embodiments, one model can be weighted to have greater influence on the final engagement rate prediction.

In some embodiments, it has been determined that the network model 308 is effective for predicting which images will perform poorly, but is not as good at predicting which images will perform well when posted to the brand-specific user account. In other words, in some testing, it appears that images that will perform poorly on the network on average are likely to perform poorly on any specific user account too. However, an image that performs well on the network on average, it less certain to perform well on any specific user account. In such embodiments, the system 100 can combine the brand-specific output engagement rate with the network model output engagement rate by lowering the final engagement rate prediction if an image has a low expected engagement rate from the network model 308, even though the image has an expected engagement rate from the brand model 208 that is higher. For example, for any image of the candidate images that was grouped into the expected poor performance category by the network-wide model, system 100 will demote a classification of the same images in the output from the brand-specific model into the expected poor performance category.

In some embodiments of other models, such as the industry model addressed above, the output can also be used and combined with the output of one or more other models using one of the mechanisms described above (averaging results or specific adjustments of predictions by a primary model).

Figure 5:
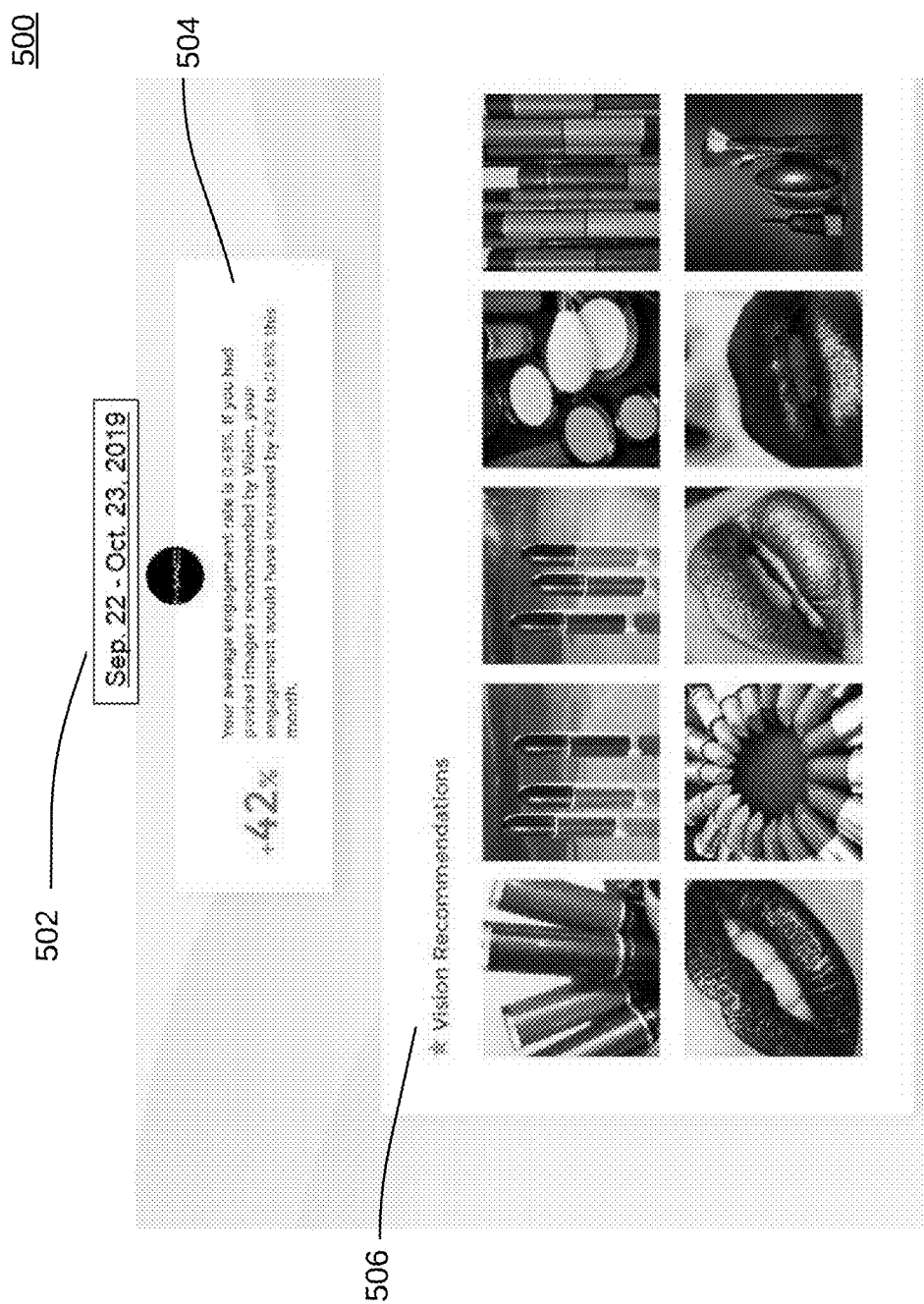
FIG. 5 illustrates an example user interface of application of the example system as shown in FIG. 1, in accordance with some aspects of the present technology.

FIG. 5 illustrates an example user interface 500, in accordance with some aspects of the present technology. This example user interface 500 is an output interface to present the final engagement rate prediction to the user. The user interface 500 includes a time window 502 showing the time period of the final engagement rate prediction. Here, the time period is from Sep. 22, 2019 to Oct. 23, 2019, which means the predictions shown in the user interface 500 are valid during this specific period.

User interface 500 also includes a final engagement rate prediction window 504 to present the final engagement rate prediction and some related results. Here, a retrospective final engagement rate prediction is shown as an example. The final engagement rate prediction window 504 includes information about the recorded average engagement rates for all the images posted by this brand account on social media platform from Sep. 22, 2019 to Oct. 23, 2019. The final engagement rate prediction window 504 also includes information about the engagement rate prediction for the recommended images in this brand account's library of possible posts. The recommended images by the system 100 includes both images that were posted and images that are not posted but have been included in the library for engagement rate prediction.

User interface 500 also includes a recommendation window 506 to present the recommended images for the brand account to post. In some embodiments, the recommended images can include the group of images with expected high performance as described with respect to FIG. 4. In some embodiments, if the number of images within the group of images with expected high performance exceeds the number of images shown, the top images can be shown first, with a side scroll down function to show the rest of the group by user's control. For example, there are ten images shown in the recommendation window 506 here, and they can be all or part of the group of images with expected high performance.

Figure 6:
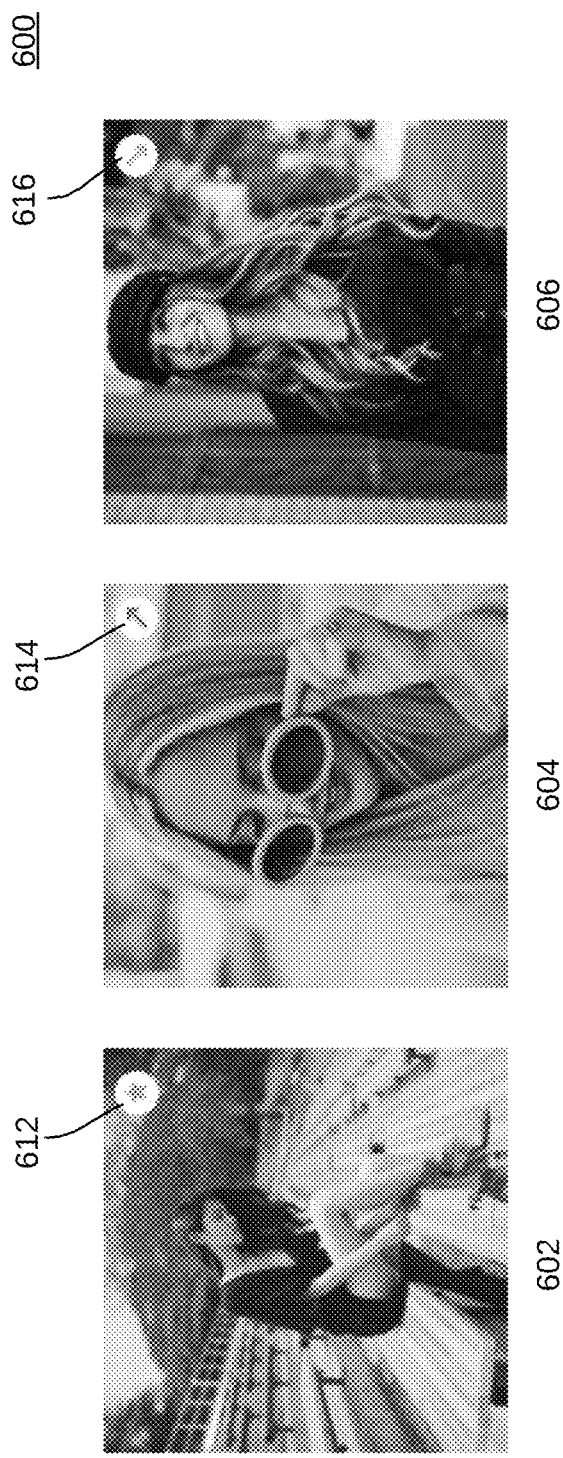
FIG. 6 illustrates another example user interface of application of the example system as shown in FIG. 1, in accordance with some aspects of the present technology.

FIG. 6 illustrates an example user interface 600, in accordance with some aspects of the present technology. This example user interface 600 is another example output interface to present the final engagement rate prediction to the user. In some embodiments, this example user interface 600 is only a portion of an interface. The user interface 600 includes three candidate images 602, 604, and 606 for potential posting and their engagement rate prediction. The engagement rate predictions are represented by the corresponding icons 612, 614, and 616 located on the top right of each of the candidate images 602, 604, and 606. In some embodiments, icon 612 represents that image 602 belongs to the group of excellent images for posting to the user. From the perspective of system 100, it represents that image 602 belongs to the group with expected high performance as discussed above with regard to FIG. 4. In some embodiments, icon 614 represents that image 604 belongs to the group of good images for posting to the user. From the perspective of system 100, it represents that image 604 belongs to the group with expected average performance as discussed above with regard to FIG. 4. In some embodiments, icon 616 represents that image 606 belongs to the group of poor images for posting to the user. From the perspective of system 100, it represents that image 606 belongs to the group with expected poor performance as discussed above with regard to FIG. 4. The icons are straightforward representations of the engagement rate prediction of each candidate images, thus it will be easy for the user to understand the result from the under interface 600.

Figure 7:
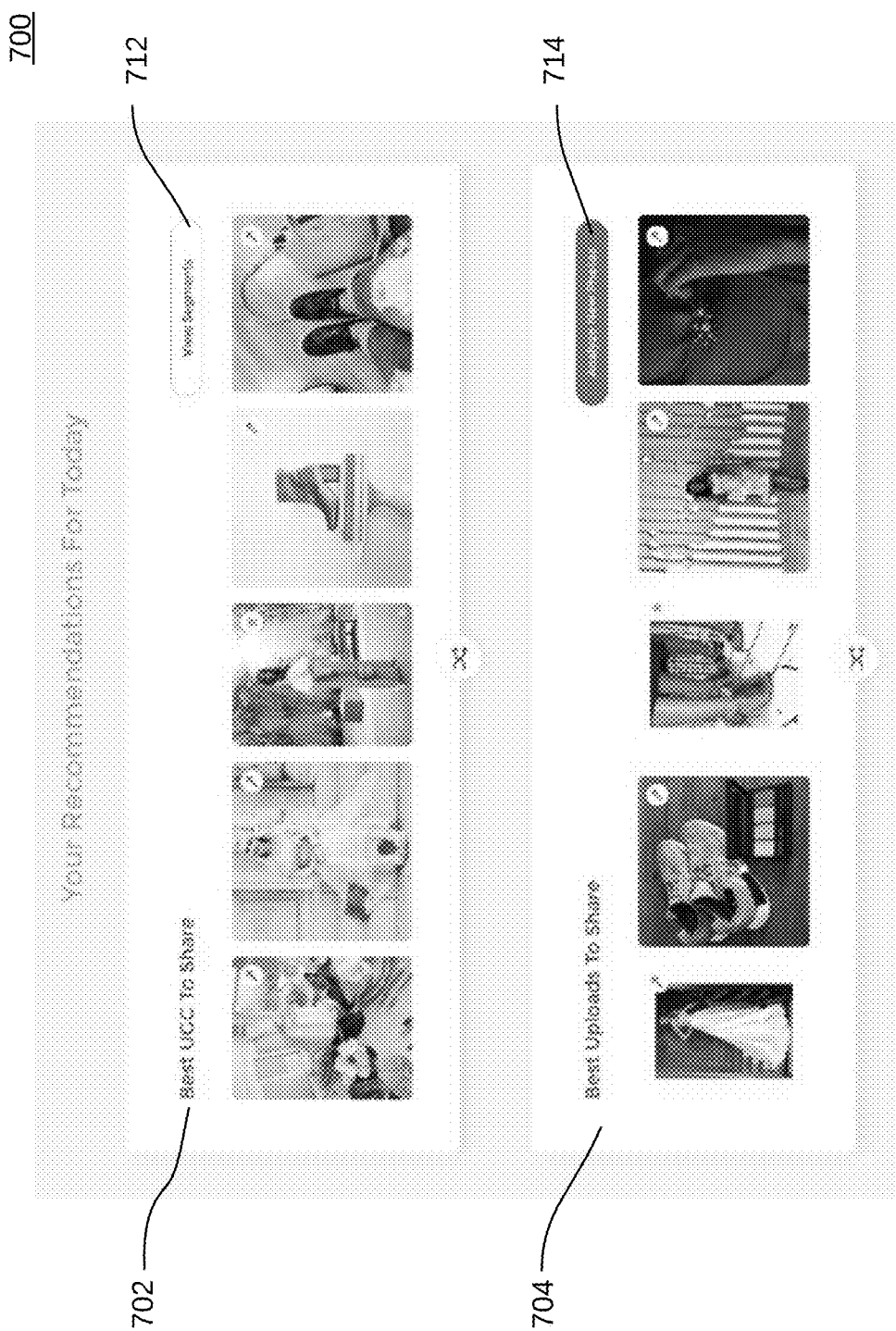
FIG. 7 illustrates yet another example user interface of application of the example system as shown in FIG. 1, in accordance with some aspects of the present technology.

FIG. 7 illustrates an example user interface 700, in accordance with some aspects of the present technology. This example user interface 700 is yet another example output interface to present the final engagement rate prediction to the user. In some embodiments, this example user interface 700 is part of the whole interface. The user interface 700 includes two columns 702 and 704 of recommended candidate images based on which segments the candidate images belong to. In some embodiments, the recommended candidate images can include both the group of excellent images for posting and the group of good images for posting for the user. In some embodiments, the recommended candidate images can include one of the group of excellent images for posting or the group of good images for posting for the user.

Column 702 includes recommended candidate images that belong to the segment of User-Generated Content (UGC). In some embodiments, User-Generated Content (UGC) includes, but is not limited to, any postings from any user that are related to a specific brand. For example, User-Generated Content (UGC) can be any postings under a hashtag that is related to a brand. In some embodiments, the user of this technology can tailor the scope of this segment of User-Generated Content (UGC). Column 702 shows five recommended User-Generated Content (UGC) images for sharing, with the middle one belongs to the group of excellent images, and the other four belong to the group of good images. Such arrangement of images is example only, there can be other arrangements of images in other embodiments. The tab 712 on the top right side of the column 702 allows the user to go to another user interface showing all segments of candidate images.

Column 704 includes recommended candidate images that belong to the segment of brand generated images. In some embodiments, brand generated images include, but is not limited to, any uploaded images from the user of this technology. Column 704 shows five recommended brand generated images for posting, with the middle one belongs to the group of excellent images, and the other four belong to the group of good images. Such arrangement of images is example only, there can be other arrangements of images in other embodiments. The tab 714 on the top right side of the column 704 allows the user to go to another user interface to upload more potential images for posting.

While the above example and respective figures may be discussed with reference to each other, such references should be considered as examples, and should not be considered limiting of the present technology.

Figure 8:
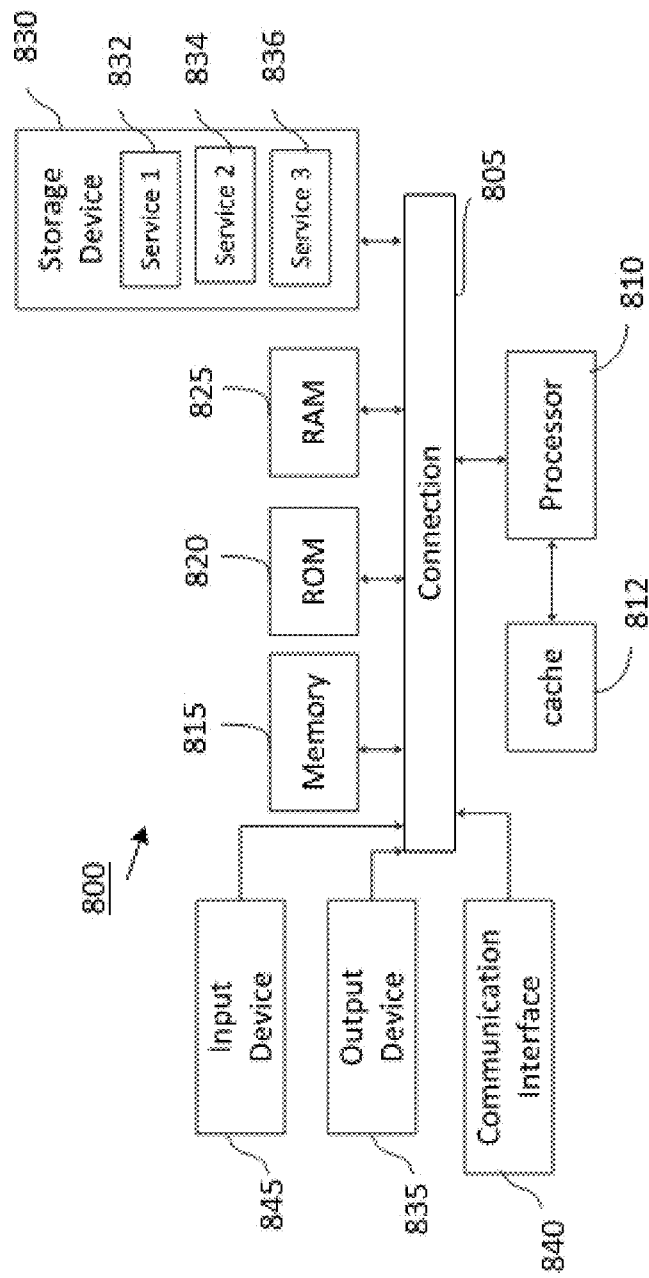
FIG. 8 illustrates an example of computing system in accordance with some aspects of the present technology.

FIG. 8 shows an example of computing system 800, which can be for example any computing device making up system 100, the trained brand model 208, the trained network model 308, or any component thereof in which the components of the system are in communication with each other using connection 805. Connection 805 can be a physical connection via a bus, or a direct connection into processor 810, such as in a chipset architecture. Connection 805 can also be a virtual connection, networked connection, or logical connection.

In some embodiments computing system 800 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 800 includes at least one processing unit (CPU or processor) 810 and connection 805 that couples various system components including system memory 815, such as read only memory (ROM) 820 and random access memory (RAM) 825 to processor 810. Computing system 800 can include a cache of high-speed memory 812 connected directly with, in close proximity to, or integrated as part of processor 810.

Processor 810 can include any general purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. There is no restriction on operating on any particular hardware arrangement and therefore the basic features here may easily be substituted for improved hardware or firmware arrangements as they are developed.

Storage device 830 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 830 can include software services, servers, services, etc., that when the code that defines such software is executed by the processor 810, it causes the system to perform a function. In some embodiments, a hardware service that performs a particular function can include the software component stored in a computer-readable medium in connection with the necessary hardware components, such as processor 810, connection 805, output device 835, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A non-transitory computer readable medium comprising instructions stored thereon, the instructions being effective to cause at least one processor to:
   receive a collection of candidate images that are candidates for posting on a social media platform;
   convert images of the collection of candidate images into a high-dimensional feature vector representing content of images of the collection of candidate images, using a trained deep learning model, wherein the feature vector is generated by an image conversion service;
   determine, using at least one artificial intelligence model including a brand model and a network model, a prediction for the images of the collection of candidate images, wherein the prediction includes an expected engagement on the social media platform, the expected engagement being a function of prior interactions with images containing similar feature vectors;

receive an output from the brand model where the output from the brand model includes a brand-specific output engagement rate for the collection of candidate images, wherein the brand-specific output engagement rate is determined based on a first number of interactions with the collection of candidate images on the social media platform related to the brand model;

receive an output from the network model where the output from the network model includes a general output engagement rate for the collection of candidate images, wherein the general output engagement rate is determined based on a second number of interactions with the collection of candidate images on the social media platform not related to the brand model;

combine the brand-specific output engagement rate and the general output engagement rate to generate a combined engagement rate prediction for the collection of candidate images representative of the expected engagement on the social media platform; and output, for display, a set of candidate images of the collection of candidate images into one or more groups based on one or more similarities of the combined engagement rate prediction of images in the set of candidate images.

2. The non-transitory computer readable medium of claim 1, wherein the at least one artificial intelligence model was trained by analyzing past engagement rates of a collection of images previously posted on the social media platform in a specific time window given information about at least one previous time window.

3. The non-transitory computer readable medium of claim 2, wherein the specific time window given the information about the at least one previous time window is represented by a Markov model.

4. The non-transitory computer readable medium of claim 2:
wherein the past engagement rates were considered a high engagement rate when an image had an engagement rate in a top 25% of all images analyzed in the collection of images or had a number of positive votes in the top 25% of all the images analyzed in the collection of images.

5. The non-transitory computer readable medium of claim 1, wherein the at least one artificial intelligence model includes a brand-specific machine learned model, wherein the brand-specific machine learned model was trained by analyzing past engagement rates of a collection of images previously posted on the social media platform by a brand-specific user account.

6. The non-transitory computer readable medium of claim 1, wherein the at least one artificial intelligence model includes a network machine learned model, wherein the network machine learned model was trained by analyzing past engagement rates of a collection of images previously posted on the social media platform by any user account on the social media platform.

7. The non-transitory computer readable medium of claim 1, wherein the at least one artificial intelligence model includes both the brand model and the network model, and wherein the instructions to determine the prediction for images of the collection of candidate images of the expected engagement further includes instructions effective to cause the at least one processor to:
receive the output from the brand model where images of the collection of candidate images is grouped into one of several categories, wherein the several categories includes expected high performance, expected poor performance, or expected average performance; and
receive the output from the network model where images of the collection of candidate images is grouped into one of the categories.

8. The non-transitory computer readable medium of claim 6, wherein the instructions to determine the prediction for images of the collection of candidate images of the expected engagement further includes instructions effective to cause the at least one processor to:
combine the output of the brand model and the network model by:
for any image of the collection of candidate images that was grouped into an expected poor performance category by the network model, demote a classification of same images in the output from the brand model into the expected poor performance category.

9. The non-transitory computer readable medium of claim 7, comprising further instructions effective to cause the at least one processor to:
present combined output predictions to a user of a brand-specific user account.

10. The non-transitory computer readable medium of claim 4, wherein a brand-specific machine learned model is retrained every week.

11. The non-transitory computer readable medium of claim 1, wherein the receiving of the collection of candidate images is automatically performed daily, wherein the prediction provides a prediction of the expected engagement on that day.

12. The non-transitory computer readable medium of claim 1, wherein the prediction is for the expected engagement of images posted within a future defined period of time.

13. A system comprising:
one or more processors; and
at least one computer-readable storage medium having stored therein instructions which, when executed by the one or more processors, cause the one or more processors to perform operations comprising:
receiving a collection of candidate images that are candidates for posting on a social media platform;
convert images of the collection of candidate images into a high-dimensional feature vector representing content of images of the collection of candidate images, using a trained deep learning model, wherein the feature vector is generated by an image conversion service;
determining, using at least one artificial intelligence model including a brand model and a network model, a prediction for the images of the collection of candidate images, wherein the prediction includes an expected engagement on the social media platform, the expected engagement being a function of prior interactions with images containing similar feature vectors;
receiving an output from the brand model where the output from the brand model includes a brand-specific output engagement rate for the collection of candidate images,
wherein the brand-specific output engagement rate is determined based on a first number of interactions with the collection of candidate images on the social media platform related to the brand model;
receiving an output from the network model where the output from the network model includes a general output engagement rate for the collection of candidate images, wherein the general output engagement rate is determined based on a second number of interactions with the collection of candidate images on the social media platform not related to the brand model;
combining the brand-specific output engagement rate and the general output engagement rate to generate a combined engagement rate prediction for the collection of candidate images representative of the expected engagement on the social media platform; and
outputting, for display, a set of candidate images of the collection of candidate images into one or more groups based on one or more similarities of the combined engagement rate prediction of images in the set of candidate images.

14. The system of claim 13, wherein the at least one artificial intelligence model was trained by analyzing past engagement rates of a collection of images previously posted on the social media platform in a specific time window given information about at least one previous time window.

15. The system of claim 13, wherein the at least one artificial intelligence model includes a brand-specific machine learned model, wherein the brand-specific machine learned model was trained by analyzing past engagement rates of a collection of images previously posted on the social media platform by a brand-specific user account.

16. The system of claim 13, wherein the at least one artificial intelligence model includes a network-wide machine learned model, wherein the network-wide machine learned model was trained by analyzing past engagement rates of a collection of images previously posted on the social media platform by any user account on the social media platform.

17. The system of claim 13, wherein the at least one artificial intelligence model includes both the brand model and the network model, and wherein the instructions to determine the prediction for images of the collection of candidate images of the expected engagement further includes instructions effective to cause the one or more processors to:
receive the output from the brand model where images of the collection of candidate images is grouped into one of several categories, wherein the several categories includes expected high performance, expected poor performance, or expected average performance; and
receive the output from the network model where images of the collection of candidate images is grouped into one of the categories.

18. The system of claim 13, wherein the instructions to determine the prediction for images of the collection of candidate images of the expected engagement further includes instructions effective to cause the one or more processors:
combine the output of the brand model and the network model by:
for any image of the collection of candidate images that was grouped into an expected poor performance category by the network model, demote a classification of same images in the output from the brand model into the expected poor performance category.

19. A method comprising:
receiving a collection of candidate images that are candidates for posting on a social media platform;
convert images of the collection of candidate images into a high-dimensional feature vector representing content of images of the collection of candidate images, using a trained deep learning model, wherein the feature vector is generated by an image conversion service;
determining, using at least one artificial intelligence model including a brand model and a network model, a prediction for the images of the collection of candidate images, wherein the prediction includes an expected engagement on the social media platform the expected engagement being a function of prior interactions with images containing similar feature vectors;
receiving an output from the brand model where the output from the brand model includes a brand-specific output engagement rate for the collection of candidate images, wherein the brand-specific output engagement rate is determined based on a first number of interactions with the collection of candidate images on the social media platform related to the brand model;
receiving an output from the network model where the output from the network model includes a general output engagement rate for the collection of candidate images, wherein the general output engagement rate is determined based on a second number of interactions with the collection of candidate images on the social media platform not related to the brand model;
combining the brand-specific output engagement rate and the general output engagement rate to generate a combined engagement rate prediction for the collection of candidate images representative of the expected engagement on the social media platform;
outputting, for display, a set of candidate images of the collection of candidate images into one or more groups based on one or more similarities of the combined engagement rate prediction of images in the set of candidate images such that images in the set of candidate images reflect expected engagement performance on the social media platform.

20. The method of claim 19, wherein the at least one artificial intelligence model includes a brand machine learned model and a network machine learned model,
wherein the brand machine learned model was trained by analyzing past engagement rates of a collection of images previously posted on the social media platform by a brand-specific user account;
wherein the at least one artificial intelligence model includes the network machine learned model, wherein the network machine learned model was trained by analyzing the past engagement rates of the collection of images previously posted on the social media platform by any user account on the social media platform.

21. The method of claim 19, wherein the at least one artificial intelligence model includes both a brand model and a network model, and the method further comprises:
receiving an output from the brand model where images of the collection of candidate images is grouped into one of several categories, wherein the several categories includes expected high performance, expected poor performance, or expected average performance;
receiving an output from the network model where images of the collection of candidate images is grouped into one of the categories; and
combining an output of the brand model and the network model by:
for any image of the collection of candidate images that was grouped into an expected poor performance category by the network model, demote a classification of same images in the output from the brand model into the expected poor performance category.

22. The non-transitory computer readable medium of claim 1, wherein:

the brand-specific model is trained by candidate images previously output by a brand-specific account, to predict the expected engagement of one or more candidate images using past engagement data as feedback corresponding to the brand-specific account.

23. The non-transitory computer readable medium of claim 1, wherein:
the one or more groups includes a first group of candidate images, a second group of candidate images, and a third group of candidate images each comprising a combined engagement rate prediction range comprising different rates of prediction from a previous group of candidate images; and
overlay one or more graphical icons representing each combined engagement rate prediction range on each image in the first, second, and third group of candidate images.

24. The non-transitory computer readable medium of claim 1, wherein the combined engagement rate prediction incorporates adjustments based on an engagement rate category as classified by the network model, wherein the combined engagement rate prediction is used to generate a combined engagement rate prediction for the collection of candidate images representative of the expected engagement on the social media platform.

25. The non-transitory computer readable medium of claim 1, further comprising:
presenting the combined engagement rate prediction in a user interface that includes a time window indicating a time period of the prediction.

26. The non-transitory computer readable medium of claim 25, wherein the user interface further includes a final engagement rate prediction window that displays the final engagement rate prediction including recorded average engagement rates for all images posted by a brand-specific account on the social media platform during a specific time period.

27. The non-transitory computer readable medium of claim 26, wherein the final engagement rate prediction window includes a comparison between the recorded average engagement rates and the predicted engagement rates for recommended images in an account library of possible posts associated with the brand-specific account.

28. The non-transitory computer readable medium of claim 1, further comprising:
displaying the output in a user interface that includes two columns of recommended candidate images, including a first column for User-Generated Content (UGC) images and a second column for brand-generated images, wherein the column for the UGC images includes images related to a specific brand, and the column for brand-generated images includes images uploaded by the user.

* * * * *